US012564851B2

(12) United States Patent
Alluigi

(10) Patent No.: US 12,564,851 B2
(45) Date of Patent: Mar. 3, 2026

(54) TRIGGER-TYPE DISPENSING HEAD FOR A DISPENSING DEVICE FOR PASTY PRODUCTS SUCH AS TOOTHPASTES

(71) Applicant: GUALA DISPENSING S.P.A., Alessandria (IT)

(72) Inventor: Riccardo Alluigi, Alessandria (IT)

(73) Assignee: Guala Dispensing S.P.A., Alessandria (IT)

( * ) Notice: Subject to any disclaimer, the term of this patent is extended or adjusted under 35 U.S.C. 154(b) by 166 days.

(21) Appl. No.: 18/570,873

(22) PCT Filed: Jul. 25, 2022

(86) PCT No.: PCT/IB2022/056840

§ 371 (c)(1),
(2) Date: Dec. 15, 2023

(87) PCT Pub. No.: WO2023/007349

PCT Pub. Date: Feb. 2, 2023

(65) Prior Publication Data

US 2024/0278270 A1 Aug. 22, 2024

(30) Foreign Application Priority Data

Jul. 30, 2021 (IT) ........................ 102021000020513

(51) Int. Cl.
*B05B 11/10* (2023.01)
*B05B 11/00* (2023.01)
*B05B 11/02* (2023.01)

(52) U.S. Cl.
CPC .......... *B05B 11/103* (2023.01); *B05B 11/007* (2013.01); *B05B 11/1053* (2023.01);
(Continued)

(58) Field of Classification Search
CPC . B05B 11/103; B05B 11/007; B05B 11/1069; B05B 11/1053; B05B 11/1059;
(Continued)

(56) References Cited

U.S. PATENT DOCUMENTS

| | | | | |
|---|---|---|---|---|
| 3,263,868 A * | 8/1966 | Sagarin | ................ | B65D 83/226 222/394 |
| 3,403,823 A * | 10/1968 | O'Donnell | ........... | B65D 83/228 222/321.9 |

(Continued)

FOREIGN PATENT DOCUMENTS

| | | |
|---|---|---|
| EP | 0277893 A1 | 8/1988 |
| EP | 0599301 A1 | 6/1994 |

(Continued)

OTHER PUBLICATIONS

International Search Report for International Patent Application No. PCT/IB2022/056840, mailed Oct. 31, 2022.

*Primary Examiner* — Paul R Durand
*Assistant Examiner* — Michael C Patterson
(74) *Attorney, Agent, or Firm* — Armstrong Teasdale LLP

(57) ABSTRACT

A manually operable head assembly for a dispenser for pasty products which has a fixed head with a dispensing duct for dispensing a product, a pumping unit with an elastically deformable cap, an actuator, a guarantee tab connected to the fixed head and having a tab body, and at least one bridge connected to the actuator is provided. The at least one bridge is suitable for breaking on a first operation of the actuator. The tab body is configured to remain connected to the fixed head following the first operation of the actuator.

14 Claims, 7 Drawing Sheets

(52) U.S. Cl.
CPC ...... *B05B 11/1059* (2023.01); *B05B 11/1069* (2023.01); *B05B 11/028* (2023.01)

(58) Field of Classification Search
CPC .............. B05B 11/028; B65D 41/3428; B65D 41/3447; B65D 2401/15; B65D 35/42; B65D 55/16; B65D 41/34
USPC ............. 222/92, 153.01, 153.05, 541.9, 543, 222/153.06; 220/268, 266, 265; 215/258, 253, 250
See application file for complete search history.

(56) References Cited

U.S. PATENT DOCUMENTS

| | | | | | |
|---|---|---|---|---|---|
| 3,698,604 | A * | 10/1972 | Nigro | B65D 83/206 | 222/402.12 |
| 4,752,020 | A * | 6/1988 | Grueter | B65D 83/20 | 222/402.15 |
| 4,807,784 | A | 2/1989 | Jupin et al. | | |
| 4,821,926 | A | 4/1989 | Battegazzore | | |
| 4,867,347 | A * | 9/1989 | Wass | B05B 11/1032 | 222/207 |
| 5,762,322 | A * | 6/1998 | Smith | B65D 83/20 | 222/402.11 |
| 11,014,108 | B2 * | 5/2021 | Knight | B05B 11/0029 | |
| 12,337,338 | B2 * | 6/2025 | Alluigi | A47K 5/18 | |
| 12,402,757 | B2 * | 9/2025 | Pigazzi | A47K 5/1201 | |
| 2008/0230559 | A1 * | 9/2008 | Nardone | B65D 55/024 | 222/402.1 |
| 2015/0102064 | A1 * | 4/2015 | Taberlet | B05B 11/1054 | 222/153.05 |
| 2018/0029758 | A1 * | 2/2018 | Hensen | B65D 41/0414 | |
| 2020/0346235 | A1 * | 11/2020 | Knight | B05B 11/1074 | |

FOREIGN PATENT DOCUMENTS

| | | | | | |
|---|---|---|---|---|---|
| EP | 2330055 | A1 | | 6/2011 | |
| EP | 3755643 | A1 | | 12/2020 | |
| FR | 2875797 | A1 | * | 3/2006 | B65D 83/00 |
| IT | 202000025594 | A1 | | 4/2022 | |
| IT | 202000025597 | A1 | | 4/2022 | |
| IT | 202100007847 | A1 | | 9/2022 | |
| WO | WO-2017046186 | A1 | * | 3/2017 | B65D 47/2006 |
| WO | WO-2024256898 | A1 | * | 12/2020 | B05B 11/1059 |
| WO | WO-2023180215 | A1 | * | 9/2023 | B65D 51/224 |
| WO | WO-2024062031 | A1 | * | 3/2024 | B05B 11/1059 |

* cited by examiner

TRIGGER-TYPE DISPENSING HEAD FOR A DISPENSING DEVICE FOR PASTY PRODUCTS SUCH AS TOOTHPASTES

CROSS-REFERENCE TO RELATED APPLICATIONS

This application is a National Stage Application of International Patent Application No. PCT/IB2022/056840, having an International Filing Date of Jul. 25, 2022, which claims priority to Italian Application No. 102021000020513, filed Jul. 30, 2021, the entire contents of each of which are hereby incorporated by reference herein.

FIELD OF THE INVENTION

The subject of the present invention is a dispensing head assembly for a push-button dispenser for pasty products, in particular toothpastes. Moreover, also part of the invention is said dispenser for pasty products.

BACKGROUND OF THE INVENTION

Such dispensers have been known for some time, and the Applicant itself holds the patent family coming under document U.S. Pat. No. 4,821,926. Such dispensers have been and continue to be widely known for certain advantages that set them apart from normal toothpaste tubes, such as, for example, ease of use, the ability to dispense practically all of the toothpaste without any remaining, and other advantages.

There are essentially two types of these dispensers on the market.

A first type, used especially for high-viscosity pastes, provides a metal stop ring on the bottom of the tube which, when the push-button is released (suction step), advances together with the piston toward the top of the tube and, when the push-button is pressed (dispensing step), prevents the piston from recoiling toward the bottom of the tube. An example embodiment is described in document U.S. Pat. No. 4,154,371.

A second type, used especially for medium- or low-viscosity pastes, instead comprises parts having lips or diaphragms that work as check valves, and therefore the piston does not have to cooperate with a stop ring. An example embodiment is described in document U.S. Pat. No. 4,402,431.

This latter type is quickly becoming widespread because it is possible to make all the components out of plastics materials belonging to the same family. As such, these dispensers are easily recyclable and meet current protection requirements. The Applicant is environmental the holder of Italian patent applications No. 10 2020 000 025 597, 10 2020 000 025 594 and 10 2021 000 007 847, for example.

Further examples of push-button dispensers are described in the documents U.S. Pat. No. 4,807,784, EP0277893 and EP0599301, in which the dispensing head comprises breakable bridges configured to remain attached to the actuator, following the first dispensing. However, in these solutions, the dispensing head is made in a single piece with the container tube or its tubular components, known as lids or skirts, leading to a significant increase in structural and are thus complexity, disadvantageous to manufacture. In addition, breakable bridges may break in an uncontrolled manner and be dispersed into the surrounding area, resulting in environmental pollution.

SUMMARY OF THE INVENTION

The object of the present invention is to make a dispenser for pasty products, in particular toothpastes, that meets the requirements of the sector, in particular with regard to the use of plastics materials and the complete recyclability of the dispensers, and allows for effective dispensing of the product.

This object is achieved by a head assembly for a dispenser and a dispenser as described and claimed herein. Advantageous embodiments of the present invention are also described.

BRIEF DESCRIPTION OF THE FIGURES

The features and advantages of the dispenser according to the present invention will become apparent from the following description, given as a non-limiting example in accordance with the figures in the appended drawings, wherein.

DETAILED DESCRIPTION

Figure 1:
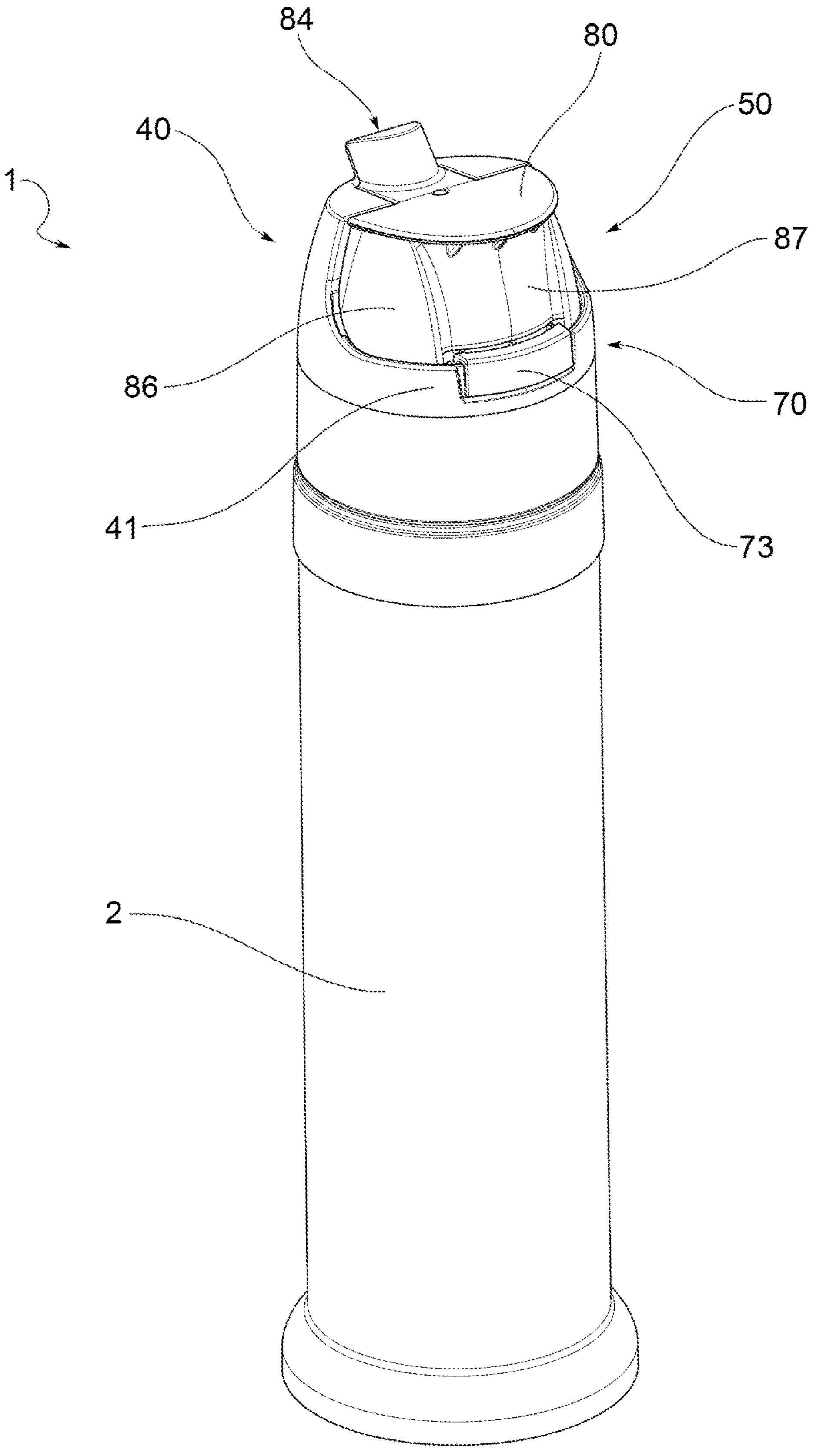
FIG. 1 depicts a dispenser for pasty products according to an embodiment of the present invention.
Figure 2:
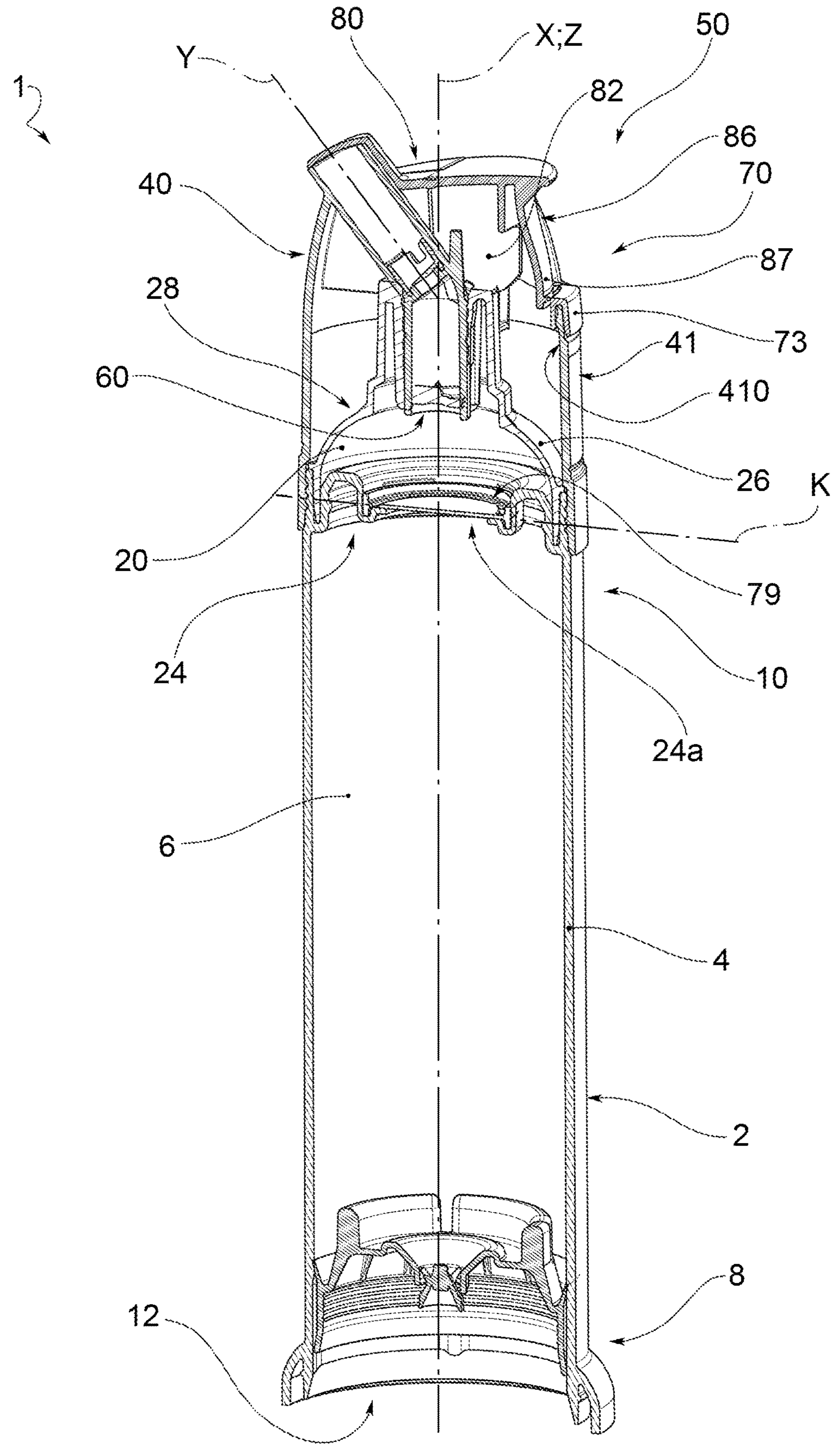
FIG. 2 is a sectional view of the dispenser in FIG. 1.

With reference to the figures in the appended drawings, reference sign 1 refers collectively to a dispenser for pasty products, in particular toothpastes, according to an embodiment of the present invention.

The dispenser 1 comprises a container tube 2, preferably made as one piece from plastics material, for example a polymer material belonging to the polyolefin group, such as polypropylene (PP).

The container tube 2 comprises an annular, typically circular cylindrical tube wall 4 having a central axis Z. The tube wall 4 peripherally delimits a tube compartment 6, intended to contain the pasty product. The tube wall 4 goes from a lower end 8, which is itself open and through which the tube wall 4 is filled with the pasty product, to an upper end 10 to which a dispensing head 50, to be discussed later, is applied.

The dispenser 1 further comprises a piston 12 received in the tube compartment 6 by an interference fit, designed to slide axially from the lower end 8, where it is located when the tube compartment 6 is full of product, to the upper end 10 as the product is dispensed.

Preferably, the piston 12 is made of a plastics material, preferably a polymer material belonging to the polyolefin group, for example high-density polyethylene (HDPE).

The dispensing head 50 comprises a main chamber 20 placed at the upper end 10 of the container tube 2 and suitable for containing the product that is about to be dispensed.

The dispensing head 50 comprises a pumping unit 28 that comprises an elastically deformable cap 26.

According to a preferred embodiment, the main chamber 20 is delimited at the bottom by a separating wall 24, occupying the tube compartment 6 in the diametrical direction, and at the top by the cap 26 of the pumping unit 28. The separating wall 24 is provided with a suction opening 24*a* suitable for establishing communication between the tube compartment 6 and the main chamber 20. Preferably, the suction opening 24*a* sits on an imaginary plane K perpendicular to the main axis X.

According to an embodiment of the invention, the separating wall 24 is a single piece together with the container tube 2.

Preferably, the separating wall 24 comprises an annular functional seat 34, to receive a support for a valve body, which will be discussed later herein, and a support crown 35, placed radially inside the functional seat 34, to support said valve body.

The dispensing head 50 comprises a fixed head 40 which may be applied to the container tube 2 at the upper end 10. For example, the fixed head 40 is snapped into an end segment 22 of the tube wall 4.

The fixed head 40 comprises a dispensing duct 42 suitable for connecting the main chamber 20 to the external environment for dispensing the product.

Preferably, the dispensing duct 42 comprises an initial segment 44 that opens directly into the main chamber 20, and an end segment 46 connected to the initial segment 44 and ending with an opening 47 for dispensing the product, positioned in a front region of the dispensing head 50.

Preferably, the initial segment 44 lies along a main axis X, preferably coaxial to the tube wall 4, i.e., coincident with the central axis Z; the end segment 46, however, is preferably inclined and therefore lies along a dispensing axis Y that is inclined with respect to the central axis Z.

Having applied the fixed head 40 to the container tube 2, an operating region 43 is delimited between said fixed head 40 and the separating wall 24, in which operating region the dispensing duct 42 and the pumping unit 28, which is applied and cooperates with the separating wall 24, are arranged.

The pumping unit 28, comprised of a hollow shell, is made as one piece from plastics material, for example a polymer material belonging to the polyolefin group, such as low-density polyethylene (LDPE).

The pumping unit 28 comprises an elastically deformable, dome-shaped cap 26. Said cap 26 is suitable for being deformed with respect to a rest condition in order to reduce the volume of the main chamber 20 and cause the product to be dispensed.

The pumping unit 28 further comprises a pump neck 55 connected to the cap 26 and protruding axially therefrom. The pump neck 55 is slidably inserted onto the initial segment 44 of the dispensing duct 42.

For example, the pump neck 55 is comprised of a tubular column portion 56, preferably coaxial with the central axis Z, and a tubular guide portion 58 connected to the column portion 56 and contained radially and preferably also axially therein. In other words, the guide portion 58 forms a flap with respect to the column portion 56, thus making therewith an annular inverted "U"-shaped section.

The dispensing head 50 further comprises an intermediate valve or shutoff valve suitable for allowing product to pass from the main chamber 20 to the dispensing duct 42 during a product dispensing step, and preventing product from coming out of the main chamber 20 and going to the dispensing duct 42 when the container tube is being filled with the product.

For example, the pumping unit 28 comprises a bottom 60 supported by the pump neck 55 and in particular by the guide portion 58; the bottom 60 is provided with a plurality of bottom openings 62 arranged circumferentially. Once the pumping unit 28 and the fixed head 40 are applied to the container tube 2, the initial segment 44 of the dispensing duct 42 is inside the guide portion 58 and, in an initial rest condition, the appropriately shaped, free lower end 44*b* of said initial segment 44 closes said bottom openings 62 of the bottom 60. The free end 44*b* and the bottom 60 provided with bottom openings 62 form an example of said intermediate valve or shutoff valve.

The dispensing head 50 further comprises an upper valve or delivery valve 72, placed downstream of the intermediate valve, suitable for allowing the product to pass from the main chamber 20 to the external environment during a product dispensing step, and for preventing the return of product or air from the external environment into the main chamber 20 during a product suction step.

For example, a delivery port 66 is placed at the connection between the initial segment 44 and the end segment 46 of the dispensing duct 42, with a cup 67 housed in the end segment 46 cooperating therewith, said cup 67 being comprised of an annular cup wall 69 and a flexible cup flap 71 suitable for closing the delivery port 66, acting as a shutter. The delivery port 66 and the cup flap 71 constitute an example of said upper valve or delivery valve 72.

The dispensing head 50 further comprises a lower valve or suction valve 76 suitable for allowing product to pass from the tube compartment 6 to the main chamber 20 during a product suction step, and for preventing the return of the product from the main chamber 20 to the tube compartment 6 during a product dispensing step.

To that end, the dispensing head 50 comprises a valve body 74 that cooperates with the suction opening 24*a*.

Preferably, the valve body 74 comprises a support 78 comprised, for example, of an annular wall, received at least partially in the functional seat 34 of the separating wall 24, and a tab 77 comprised radially in the support 78 which, by cooperating with the separating wall 24, is suitable for closing off the suction opening 24*a*.

Preferably, moreover, the valve body 74 comprises a plurality of elastically deformable hinge portions 79 which connect the tab 77 to the support 78 and, by deforming, allow said tab 77 to move from a closed configuration of the suction opening 24*a* assumed during the product suction step to an open configuration of the suction opening 24*a* assumed during the product dispensing step.

In particular, by means of said hinge portions 79, for example three in number, the tab 77 is arranged in a cantilevered fashion inside the support 78, i.e., spaced from said support 78 so as to form an annular gap 78*a* therewith, except at said hinge portions 79.

Preferably, the tab 77 rests on the support crown 35 in the closed configuration of the suction opening 24*a*.

According to a variant embodiment, the tab 77 is comprised of a single planar body, e.g., circular in shape, e.g., made in one piece with the support 78, which rests perimeterwise on the support crown 35.

The dispensing head 50 further comprises an actuator 80, for example in the form of a button, held at the back so as to be movable such as by rotation or translation from the fixed head 40, and suitable for influencing the pumping unit 28 so as to cause the deformation of the cap 26 and the dispensing of the product. For example, the actuator 80 comprises an influence portion 82 in contact with the connection area between the column portion 56 and the guide portion 58, such that the squeezing thereof causes deformation of the cap 26.

Preferably, during the product dispensing step, the actuator 80 makes a roto-translatory motion toward the rear region of the dispensing head 50 and axially toward the separating wall 24.

Preferably, the actuator 80 also comprises a closing portion 84 suitable for closing, in a rest configuration of the dispenser, the opening 47 of the dispensing duct 42.

The actuator 80 is made as a single piece from plastics material, for example a polymer material chosen from the polyolefin group, such as polypropylene (PP).

The dispensing head 50 comprises a guarantee tab 70, made in one piece with the actuator 80, engaged mechanically to the fixed head 40, e.g., glued or by means of a shape or force coupling. The guarantee tab 70 comprises a tab body 73 and at least one bridge 75, e.g., three bridges 75, that connects the tab body 73 to the actuator 80, preferably to one of its outer actuator surfaces 81. In particular, the at least one bridge 75 is configured to break on the first operation of the actuator 80; further, the tab body 73 is configured to remain engaged mechanically to the fixed head 40 following the first operation of the actuator 80.

In other words, the actuator 80 is a separate component from the fixed head 40. In particular, the actuator 80 is at least partially supported by the fixed head 40. By means of the guarantee tab 70, the actuator 80 is connected to the fixed head 40.

In still other words, the guarantee tab 70 is a distinct component from the fixed head 40.

Preferably, the fixed head 40 comprises an annular wall 41, positioned at the back, ending axially with an upper edge 415 to which the tab body 73 is engaged. For example, the tab 73 comprises body a coupling portion 735, projecting radially outward, snap-engaged to said upper edge 415.

For this purpose, the upper edge 415, having an inner annular surface 410, comprises a coupling tooth 416 projecting radially from said inner annular surface 410, configured to be snap-engaged by the coupling portion 735.

Preferably, the tab body 73 comprises an outer wall 731 and an inner wall 733 spaced radially, and an upper wall 732 joining them, forming an inverted "U"-shaped section, on an imaginary plane containing the main axis X.

Specifically, the guarantee tab 70 has a continuous planar joining surface 737, i.e., without depressions or protrusions, that joins the at least one bridge 75 with said upper wall 732 at the top. In other words, the at least one bridge 75 and the upper wall 732 are axially aligned and radially contiguous, making the state of the at least one bridge 75 better visible.

In still other words, the inner wall 733 is radially spaced from the outer actuator surface 81 of the actuator 80.

Preferably, the inner wall 733 is provided with the coupling portion 735 at its lower axial end.

In a preferred embodiment, the outer wall 731 extends for a greater axial length with respect to the axial length of the inner wall 733, e.g., it extends axially beyond the coupling portion 735, making the guarantee tab 70 particularly rigid and resistant to impact or any attempts at removal.

In a preferred embodiment, the bridge 75 comprises, preferably arranged in a radial direction: an attachment portion 751 connected to the tab body 73, a breakable portion 752 configured to separate from the attachment portion 751 at the first operation of the actuator 80, connected between the and a resistant portion 753 breakable portion 752 and the actuator 80. Preferably, the resistant portion 753 has a trapezoidal section on an imaginary plane containing the main axis X.

Figure 6:
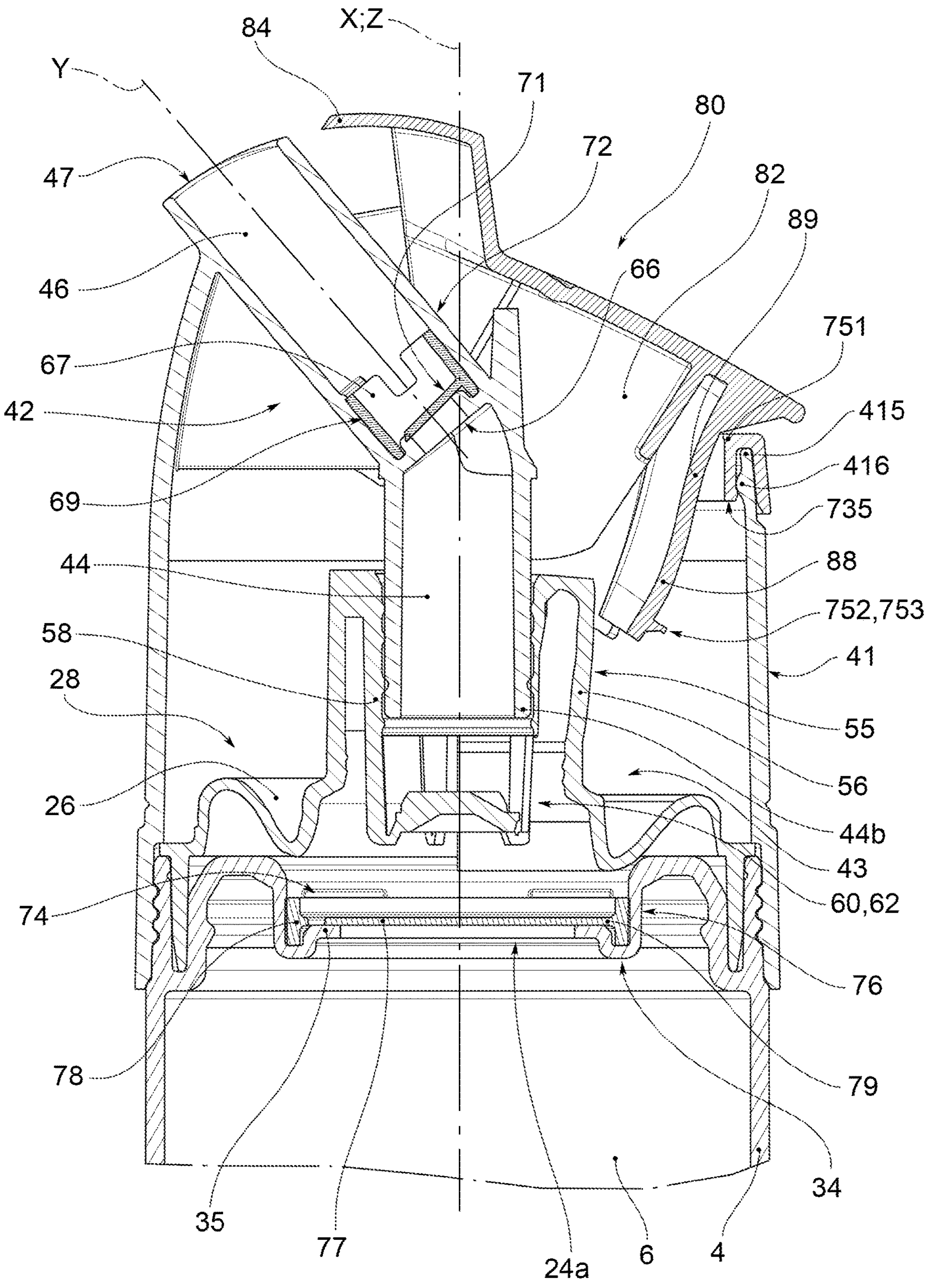
FIG. 6 is a sectional view of the head assembly in a dispensing configuration of the product.

In other words, following the first operation of the actuator 80, the attachment portion 751 and the breakable portion 752 are connected to the actuator 80, while the resistant portion 753 is connected to the tab body 73 (FIG. 6).

The actuator 80 comprises an annular wall 86 which integrally engages the fixed head 40 and has a sliding portion 87 positioned at the rear and radially lowered inwardly with respect to the annular wall 86, suitable to slide axially freely with respect to the guarantee tab 70, and in particular with respect to the inner wall 733. Preferably, moreover, with the bridge 75 intact, the at least one bridge 75 is connected to said sliding portion 87.

Figure 5A:
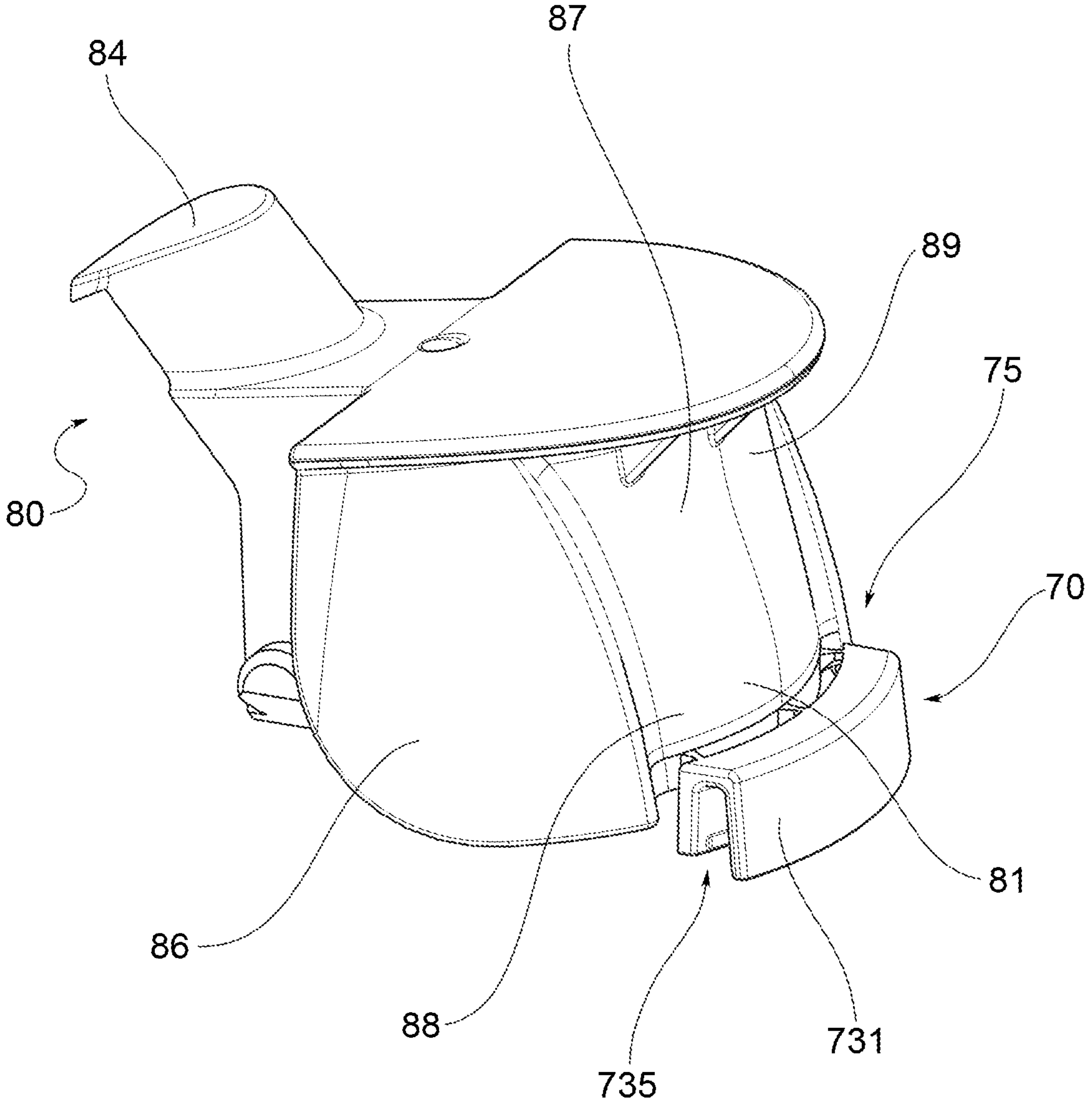
FIG. 5*a* shows a fixed head of the head assembly, according to an embodiment of the invention, in the initial configuration.
Figure 5B:
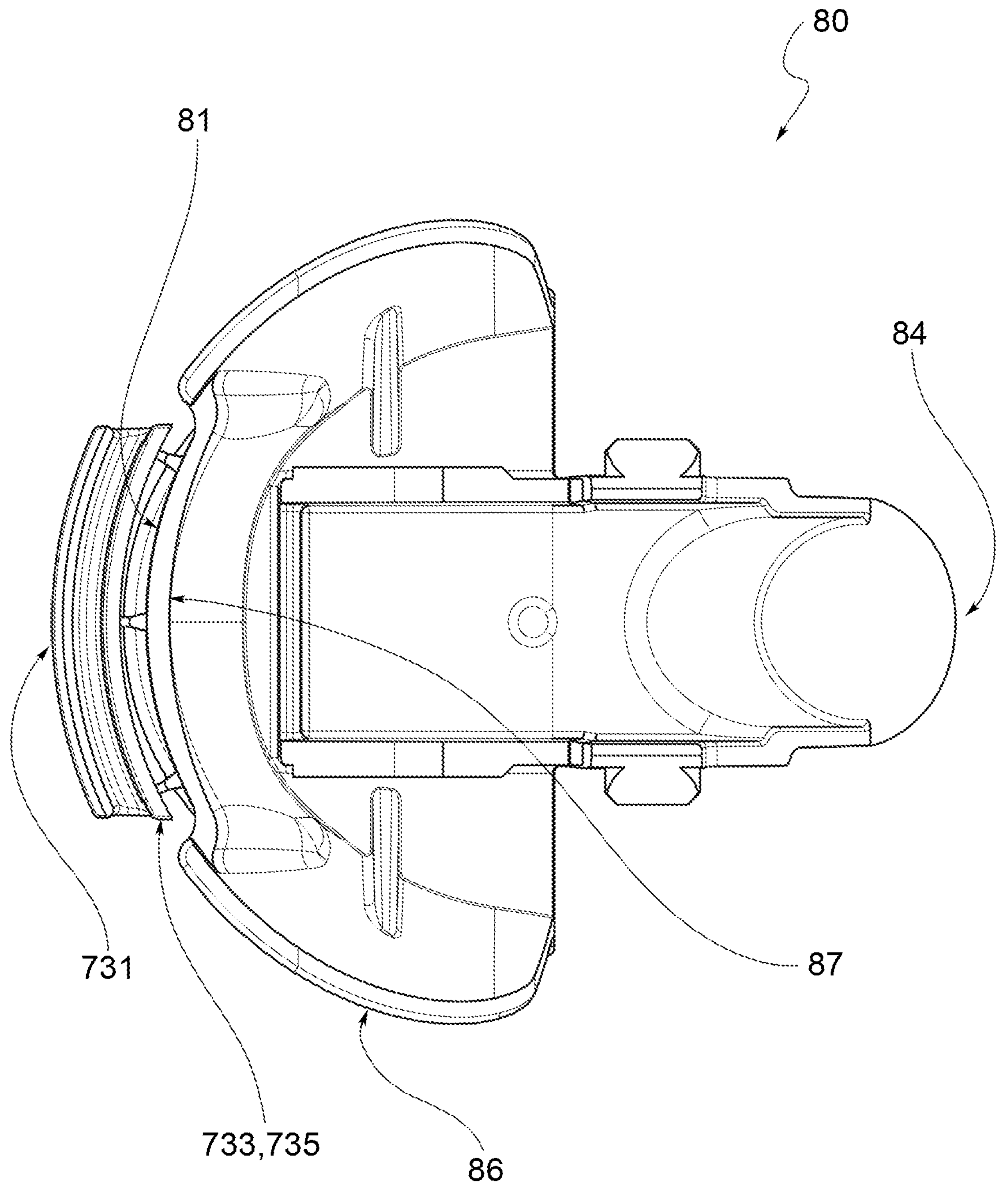
FIG. 5*b* is a bottom view of the fixed head shown in FIG. 5*a;*

In a preferred embodiment, moreover, the inner wall 733 is positioned radially at the same radial distance as the annular wall 86, relative to the main axis X. In other words, the inner wall 733 is radially positioned on the imaginary circumference over which the annular wall 86 extends, as seen, for example, in FIG. 5*b*. Preferably, by doing so the dispensing head 50 is compact overall, so that it does not protrude radially from the profile of the tube wall 4.

In a preferred embodiment, the sliding portion 87, in an imaginary plane containing the main axis X, has an "S"-shaped section comprising an upper region 89 that is outwardly concave, and a lower region 88 that is outwardly convex and connected to at least one bridge 75. In other words, the lower region 88 of the sliding portion 87 provides the external actuator surface 81.

The sliding portion 87 has a circumferential extension at least equal to the inner wall 733 and is thus shaped to move relative to the guarantee tab 70, resolving the risk of interfering with it by removing it from the fixed head 40.

Figure 3:
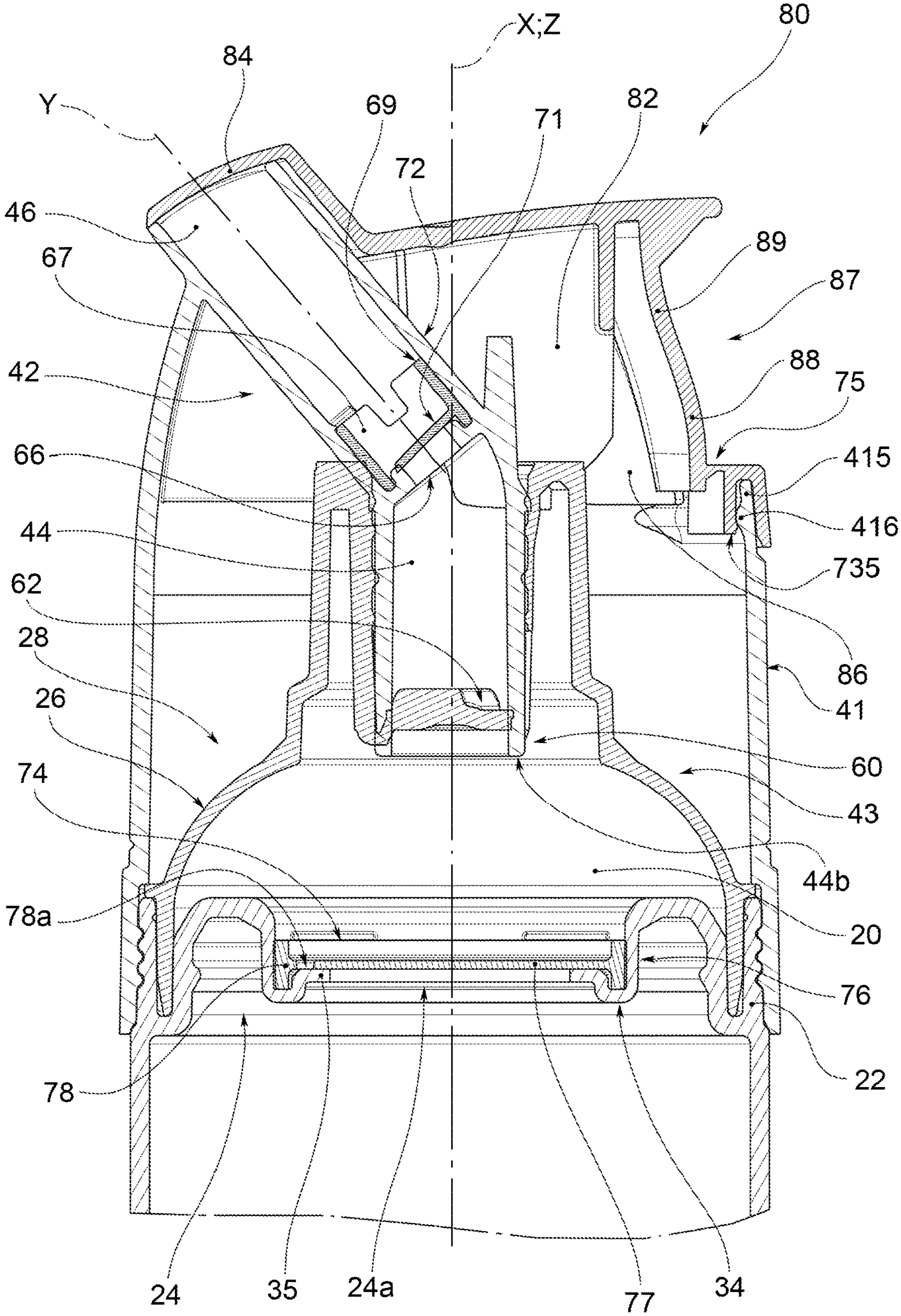
FIG. 3 is a sectional view of a head assembly of the dispenser according to one embodiment of the invention, in an initial configuration.
Figure 4:
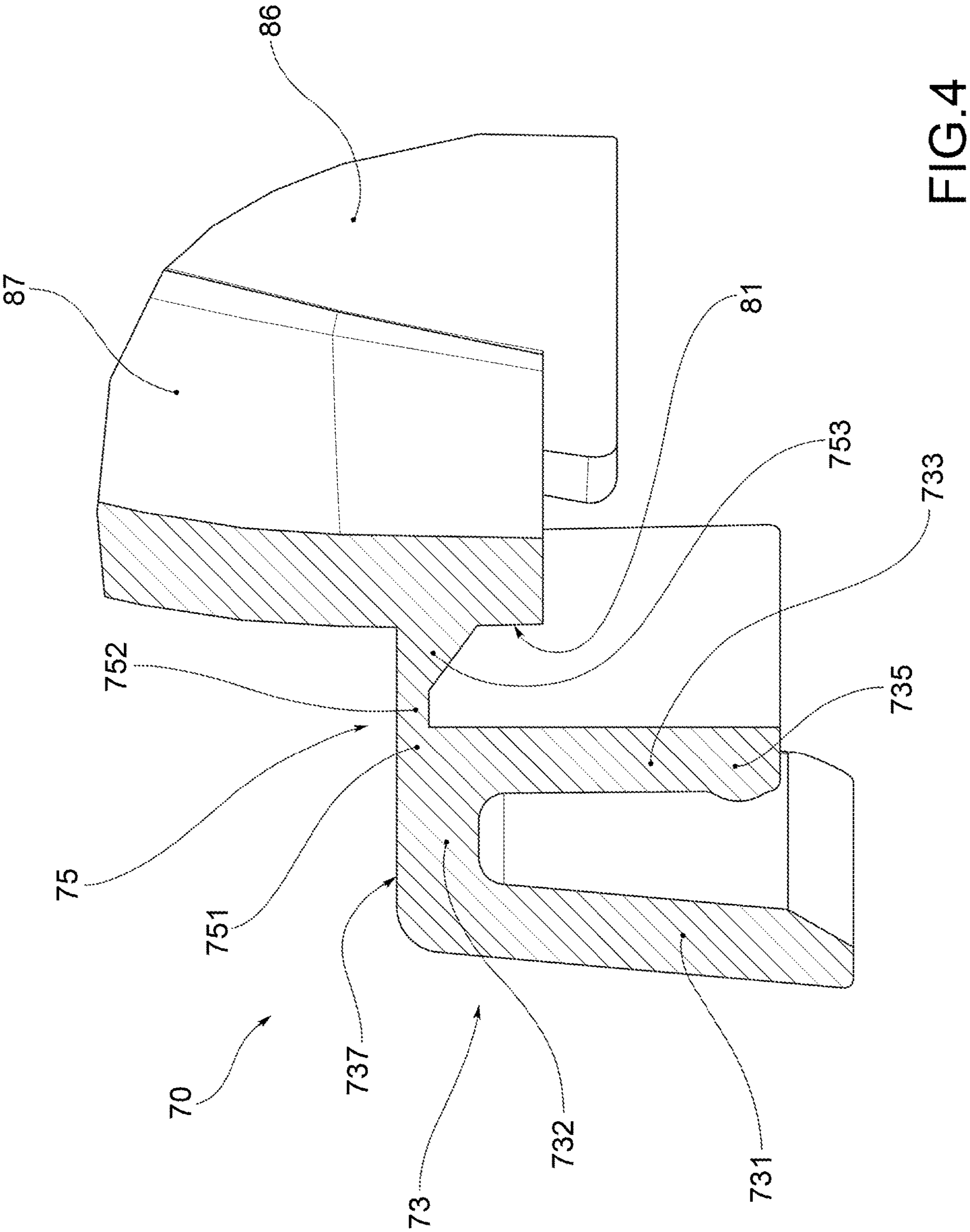
FIG. 4 shows an enlargement of FIG. 3, in which the guarantee tab is highlighted.

Regarding the operation of the dispensing head 50, in its initial or resting configuration (FIG. 3), the pumping unit 28 is in an initial non-deformed condition, the cup flap 71 blocks the delivery port 66 (delivery valve closed), the tab 77 is in sealed contact with the support crown 35 (suction valve closed), and the bottom 60 is engaged with the lower end of the initial segment 44 so that the bottom openings 62 are blocked (shutoff valve closed). Moreover, the closing portion 84 of the actuator 80 blocks the opening 47 of the dispensing duct 42.

A dispensing step (FIG. 6) takes place with the operation of the actuator 80 by the gradual deformation of the pumping unit 28 and in particular the cap 26.

When the actuator 80 is operated, in effect, the closing portion 84 is disengaged at least partially from the opening 47, leaving it free to dispense the product.

During the dispensing step, the cap 26 of the pumping unit 28 is deformed, guided along the main axis X along which the guide portion 58 translates. A resulting reduction of the volume of the main chamber 20 occurs, while the overpressure caused by the squeezed product keeps the suction valve 76 in the closed configuration. In other words, the tab 77 is pushed into sealed contact with the support crown 35, thus closing the suction opening 24*a*. This prevents the product contained in the main chamber 20 from returning to the tube compartment 6 of the tube 2.

At the same time, due to the thrust practiced by the actuator 80, the column portion 56 lowers, preferably guided in this movement by the guide portion 58, which slides as it is guided into contact with the dispensing duct 42 and in particular with the initial segment 44 thereof.

The lowering of the column portion 56 causes the bottom 60 to lower and disengage from the initial segment 44 of the dispensing duct 42; in particular, the lower end of the initial segment 44 emerges through the bottom openings 62. The shutoff valve thus changes to the open configuration and the product contained in the main chamber 20 comes through the bottom openings 62 in the bottom 60.

At the same time, due to the action of the product which is now located between the bottom 60 and the initial segment 44 of the dispensing duct 42, the cup flap 71 moves away from the delivery port 66. The delivery valve 72 thus changes to the open configuration and the product may come out through the opening 47 of the dispensing duct 42.

When the actuator 80 reaches the end of travel, the dispensing step ends and, after the actuator 80 is released, a suction step occurs, during which time a predefined quantity of product contained in the tube compartment 6 enters the main chamber 20.

In particular, when the actuator 80 is released, the pumping unit 28 tends to return to the non-deformed condition and influences the actuator 80 in that direction, which tends to return to the initial condition. Therefore, the volume of the main chamber 20 tends to increase and the resulting partial vacuum causes the tab 77 to bend, disengaging from the support crown 35. A predefined quantity of product contained in the tube compartment 6 is thus drawn into the main chamber 20.

At the same time, the cup flap 71 recloses the delivery port 66 such that the delivery valve 72 returns to the closed configuration. This ensures that the product in the dispensing duct 42 between the delivery valve 72 and the opening 47 does not return to the main chamber 20, nullifying the suction of new product from the tube compartment 6.

At the same time, the closing portion 84 of the actuator 80 tends to return to the initial condition in which the opening 47 is blocked, thereby cutting off the flow of dispensed product and facilitating separation of the dispensed quantity.

Once the cap 26 has returned to the non-deformed condition, the bottom 60 also returns to the initial position in which it engages with the initial portion 44; the shutoff valve thus returns to the closed configuration and, since the overpressure in the main chamber has ceased, the suction valve 76 also returns to the closed configuration.

Innovatively, the dispensing head and the dispenser comprising it according to the present invention are particularly products, suitable to dispense pasty presenting a particularly effective suction step. Advantageously, moreover, the tab body is also configured to remain firmly connected to the dispensing head during the life cycle of the dispenser, resolving the risk of its dispersion into the environment, favoring the total recyclability of the dispenser.

Advantageously, the guarantee tab is configured to highlight tampering of the dispenser, such as a previous operation of the actuator. Advantageously, the tab body remains mechanically engaged to the fixed head, demonstrating at first glance and in a clear way an actuation occurred, resolving the need to inspect the condition of the guarantee tab.

It is clear that a person skilled in the art, in order to satisfy current needs, could make modifications to the dispenser described above, all being contained within the scope of protection as defined in the following claims.

For example, according to a variant embodiment not shown in the attached figures, the tab body is circumferentially discontinuous, i.e., it comprises a plurality of angularly spaced half-bodies, preferably each comprising at least one bridge.

For example, according to a further variant embodiment, the tab body is either glued or heat-sealed to the fixed head.

The invention claimed is:

1. A manually operable head assembly for a dispenser for pasty products, comprising:

a fixed head suitable for being applied to a container tube of the dispenser, said fixed head being provided at a front of the head assembly with a dispensing duct comprising an opening for dispensing a product and provided with an initial segment extending along a main axis, wherein the fixed head comprises an annular wall, positioned at a back of the head assembly, axially ending with an upper edge;

a pumping unit comprising an elastically deformable cap guided under deformation along said main axis;

an actuator movably supported by the fixed head and suitable for being manually operated to deform at least partially the pumping unit and achieve dispensing of the product;

a guarantee tab made in one piece with the actuator and mechanically engaged to the fixed head, wherein the guarantee tab comprises a tab body and at least one bridge for connection with the actuator, the at least one bridge being breakable on a first operation of the actuator, wherein the tab body is configured to remain mechanically engaged to the fixed head following the first operation of the actuator, wherein the tab body comprises an outer wall and an inner wall radially spaced, and an upper wall joining the outer wall and the inner wall, forming an inverted U-shaped section on an imaginary plane containing the main axis, wherein the tab body is engaged to the upper edge of the annular wall, and wherein the upper edge is positioned radially between the outer wall and the inner wall of the tab body.

2. The manually operable head assembly of claim 1, wherein the tab body comprises a coupling portion snap-engaged with the upper edge.

3. The manually operable head assembly of claim 2, wherein the upper edge, having an inner annular surface, comprises a coupling tooth, radially protruding from the inner annular surface, the coupling tooth being configured to be snap-engaged by the coupling portion.

4. The manually operable head assembly of claim 1, wherein the guarantee tab further comprises a continuous planar joining surface that joins an upper end of the at least one bridge to an upper end of the upper wall.

5. The manually operable head assembly of claim 1, wherein the outer wall extends over a longer axial length than an axial length of the inner wall.

6. The manually operable head assembly of claim 1, wherein the inner wall is radially spaced apart from an outer actuator surface of the actuator.

7. The manually operable head assembly of claim 1, wherein the at least one bridge comprises an attachment portion connected to the tab body, a breakable portion configured to separate from the attachment portion, and a resistant portion connected to the breakable portion and to the actuator, said resistant portion having a trapezoidal section on an imaginary plane containing the main axis.

8. The manually operable head assembly of claim 1, wherein the actuator comprises an annular wall that engages the fixed head, said annular wall comprising a radially lowered sliding portion suitable to freely axially slide with respect to the guarantee tab.

9. The manually operable head assembly of claim 8, wherein the radially lowered sliding portion has an S-shaped section on an imaginary plane containing the main axis, the radially lowered sliding portion comprising an upper region that is concave outwards, and a lower region that is convex outwards and connected to the at least one bridge.

10. The manually operable head assembly of claim 8, wherein the inner wall is radially spaced apart from an outer actuator surface of the actuator, and wherein the inner wall is positioned at a same radial distance as the annular wall of the actuator with respect to the main axis.

11. The manually operable head assembly of claim 1, further comprising a separating wall cooperating with the pumping unit, suitable for delimiting at least partially a main chamber with the elastically deformable cap, separating the main chamber from a tube compartment of the dispenser, wherein said separating wall has a suction opening suitable for putting the tube compartment in communication with the main chamber, and a suction valve suitable for allowing the product to pass from the tube compartment to the main chamber during a product suction step, and to prevent the product from returning from the main chamber to the tube compartment during a product dispensing step, wherein said suction valve comprises a valve body that cooperates with the suction opening and comprises a tab which, in the product suction step, bends and opens the suction opening, and in the product dispensing step, closes the suction opening.

12. The manually operable head assembly of claim 11, wherein the valve body comprises an annular support, supported by the separating wall, and a plurality of hinge portions made in one piece and elastically deformable, and wherein each hinge portion of the plurality of hinge portions joins the tab to the annular support.

13. The manually operable head assembly of claim 1, wherein the actuator is distinct from the fixed head and connected to the fixed head by the guarantee tab.

14. A manually operable dispenser for pasty products, comprising:

a container tube for containing the product; and the manually operable head assembly of claim 1, applied to the container tube.

* * * * *